United States Patent
Tung et al.

(10) Patent No.: US 6,512,787 B1
(45) Date of Patent: Jan. 28, 2003

(54) DIGITAL IMPAIRMENT LEARNING METHOD AND SYSTEM

(75) Inventors: Chien-Cheng Tung, Fremont, CA (US); Di Zhou, San Jose, CA (US)

(73) Assignee: PC-Tel, Inc., San Jose, CA (US)

( * ) Notice: Subject to any disclaimer, the term of this patent is extended or adjusted under 35 U.S.C. 154(b) by 0 days.

(21) Appl. No.: 09/298,623

(22) Filed: Apr. 23, 1999

(51) Int. Cl.[7] .............................. H04B 1/38; H04L 5/16
(52) U.S. Cl. .................. 375/222; 375/224; 375/233; 375/367; 370/523; 370/515
(58) Field of Search .................. 375/224, 222, 375/219, 257, 231, 232, 233, 365, 354, 367, 368; 370/509, 523, 515

(56) References Cited

U.S. PATENT DOCUMENTS

| | | | | |
|---|---|---|---|---|
| 6,002,713 A | * | 12/1999 | Goldstein et al. | 375/222 |
| 6,023,493 A | * | 2/2000 | Olafsson | 375/354 |
| 6,088,334 A | * | 7/2000 | Davenport et al. | 370/252 |
| 6,266,382 B1 | * | 7/2001 | Lai | 375/354 |
| 6,272,171 B1 | * | 8/2001 | Okunev et al. | 375/222 |

* cited by examiner

*Primary Examiner*—Phuong Phu
(74) *Attorney, Agent, or Firm*—Skjerven Morrill LLP; Philip W. Woo

(57) ABSTRACT

Short pseudo-random (PR) probing sequences that comply with ITU V.90 digital impairment learning (DIL) descriptors provide DIL probing sequences that yield high performance in severe inter-symbol interference (ISI) channels. The short PR sequences do not require the insertion of extra zero symbols to get rid of ISI. Further, a novel receiving structure corrects for propagation of digital impairment common in conventional equalizers for an ISI free receipt of the probing sequences within the strictly time constrained probing sequence. Based on the reliably received signals, general digital impairment mapping tables, digital pads, regular and strange RBS patterns, and different types of PCM codecs (A-law/μ-law) are identified.

16 Claims, 3 Drawing Sheets

DIGITAL IMPAIRMENT LEARNING METHOD AND SYSTEM

CROSS-REFERENCE TO ATTACHED APPENDIX

Appendix A contains the following files in one CD-ROM (of which two identical copies are attached hereto), and is a part of the present disclosure and is incorporated by reference herein in its entirety:

Volume in drive D is 020129_1155
Volume Serial Number is E6C3-5E3C
Directory of d:\
1/29/02 11:55a <DIR>
1/29/02 11:55a <DIR>
1/29/02 11:47a 65,024 $0PN01!.DOC
   3 File(s) 65,024 bytes
Total Files Listed:
   3 File(s) 65,024 bytes
   0 bytes

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Invention

This invention relates to communications systems such as modems and to methods for detecting or characterizing digital impairment that occurs when communicating via a telephone network.

2. Description of Related Art

ITU standard V.90 defines 56K modems use of digital and PCM (pulse code modulated) signals for downstream communication from a service provider to a home user. For such communications, the telephone system includes a digital network that carries a digital signal, a PCM codec that converts the digital signal to a PCM signal, and telephone wires that bring the PCM signal to the downstream modem. In interpreting a received signal, 56K modems must have a precise model of the PCM codec at the digital/analog network interface and a precise model of the digital impairment over the digital telephone network. Generally, modems communicating via a telephone network can easily identify or distinguish the codec type, e.g., A-law or $\mu$-law, that the telephone network uses, but identifying or distinguishing among every kind of digital impairment of connections can be challenging. 56K modem that fails to identify or learn the digital impairment, can suffer a 30% performance penalty because for accuracy, data transmission must be limited to the worst case scenario. Accordingly, a modem must correctly learn and adjust to the possible digital impairments to provide optimal performance and be commercially successful.

The common digital impairments introduced in telephone networks are well known. For example, for robbed-bit signaling (RBS), networks periodically use the least significant bit (LSB) of a PCM codeword for network control purposes. After using the robbed bits from PCM codewords, the network sets robbed bits to all zeros (even RBS), all ones (odd RBS), or alternates between zero and one (even-odd RBS). Even, odd, and even-odd RBS use the least significant bit of every sixth PCM codeword, but even-odd RBS has a period of twelve codewords because of the alternating replacement of the robbed bit with 1 and 0. RBS may also occur at more than one RBS phase due to multiple signaling in the digital network. Another kind of RBS, called middle RBS, uses a codec that maps each robbed PCM symbol to a level between the level for the PCM symbol with the LSB set to zero and the level for the PCM symbol with the LSB set to one. This document refers to even-odd RBS and middle RBS as strange RBS. Another type of digital impairment known as a digital pad, uses a look-up table that converts each PCM codeword to another PCM codeword to attenuate a signal on a channel.

Typically, the digital impairment can be modeled as a combination of RBS before a digital pad, then the digital pad and then RBS after the digital pad. A middle RBS never happens before a digital pad because middle RBS is implemented at the codec. Even-odd RBS is usually after digital pad. A general model of digital impairment includes six (or twelve) look-up tables, one for each RBS phase. Each look-up table represents the mapping of input PCM codewords to output values during the RBS phase associated with the look-up table.

A modem needs to learn or identify the above-described the digital channel impairments during handshaking to optimally selected a highest possible bit rate that can be accurately transmitted over a channel. However, analog channel impairment makes learning or identifying the digital impairment more difficult. Dealing with the analog impairments is the kernel problem of digital impairment learning.

SUMMARY

In accordance with an embodiment of the invention, short pseudo-random (PR) probing sequences that comply with ITU V.90 digital impairment learning (DIL) descriptors form DIL probing sequences. The short PR probing sequences include subsequences associated with specific codes. Each subsequence contains products of the associated code and a pseudo-random series of values +1 and −1. The pseudo-random nature of the short PR sequences cancels inter-symbol interference (ISI) so that the probing sequences do not require the insertion of extra zero symbols to remove ISI. Additionally, the DIL probing sequences yield high performance in severe inter-symbol interference (ISI) channels.

In accordance with a further aspect of the invention, a novel receiving structure corrects for equalizers that propagate of digital impairment among symbols. The receiving structure can achieve an ISI free receipt of the designed probing sequence within the strict time constraints of the ITU V.90 modem standard. The correction process solves a system of equations based on the wrapped channel response. The wrapped channel response can be determined from information obtained during training of an equalizer for the channel. General digital impairment mapping tables, digital pads, regular and strange RBS patterns, and different types of PCM codecs (A-law/$\mu$-law) can be identified from signals reliably received through the receiving structure.

In accordance with one embodiment of the invention, a DIL process includes receiving a series of samples of a probing signal transmitted through a channel and identifying a set of the samples that corresponds to a selected code. The set corresponds to repeated transmission of the code over the channel, wherein each repetition of the first code has a sign from a pseudo-random series. The DIL process then determines a plurality of averages of the samples from the set. Each average corresponds to an associated phase of robbed bit signaling that occurs in the channel. From the averages, the DIL process can identify the digital impairment in the channel. One method of identifying the digital impairment determines from the averages, specific codes output from a digital network in the channel when the selected code is input to the channel. Determined output codes for the selected code and other input codes provide measured points in a set of mappers that maps input codes to output codes. To find a set of complete mappers for the channel, the measured points can be matched with corresponding points in predetermined maps from a library stored in a memory.

To determine the output codes from the averages, the process includes: determining a scaling factor for the channel; identifying the pulse code modulation (PCM) decoding employed in the channel; scaling the averages by the scaling factor to generate scaled averages; and encoding the scaled averages using an encoding method that corresponds to the identified PCM decoding. The encoded and scaled averages indicate the measured points for the channel's mappers.

Determining the averages may include: determining a plurality of initial averages and then correcting the initial averages. Each initial average is an average of samples corresponding to an associated phase of the robbed bit signaling, and correcting the initial averages corrects for propagation of the digital impairment by an equalizer. To correct for the equalizer, the process determines a wrapped channel response for the equalizer and solves system of equations for the corrected averages. The system of equations equates a vector containing the initial averages with a product of a matrix derived from the wrapped channel response and a vector containing the averages.

In accordance with another embodiment of the invention, a process sends a novel probing signal for detection of digital impairment in a channel. The probing signal corresponds to a probing sequence that includes one or more subsequences. Each subsequence includes repetitions of an associated code, and each repetition is multiplied by an associated value from a pseudo-random series of +1 and −1. The pseudo-random sign for the subsequences cancels ISI. In accordance with another aspect of the invention, an equalization process for digital impairment learning corrects for feedback terms of an equalizer that propagate digital impairment among received values.

Another embodiment of the invention is a communication system that implements any of the processes described herein. Once such system includes a receiver with a mean value estimator, a coding identifier, a scaling estimator, a memory, and a map set identifier. The mean value estimator receives a series of samples representing a probing signal transmitted over a channel and determines a plurality of averages. Each average corresponds to a phase of robbed bit signaling on the channel. The coding identifier receives and processes the averages to identify a coding process (e.g., $\mu$-law or A-law) used in the channel. The scaling estimator receives and processes the averages to identify a scaling factor for the channel. The memory stores entries corresponding to a library of mapper sets with each mapper set defining a correspondence between input codes and output codes from a digital network. The map identifier uses information from the mean value estimator, the scaling estimator, the coding identifier, and the memory to identify an entry in the memory that matches the averages as adjusted for the scaling factor and the coding process. The entry identified indicates the digital impairment in the channel.

DETAILED DESCRIPTION OF THE PREFERRED EMBODIMENTS

Figure 1:
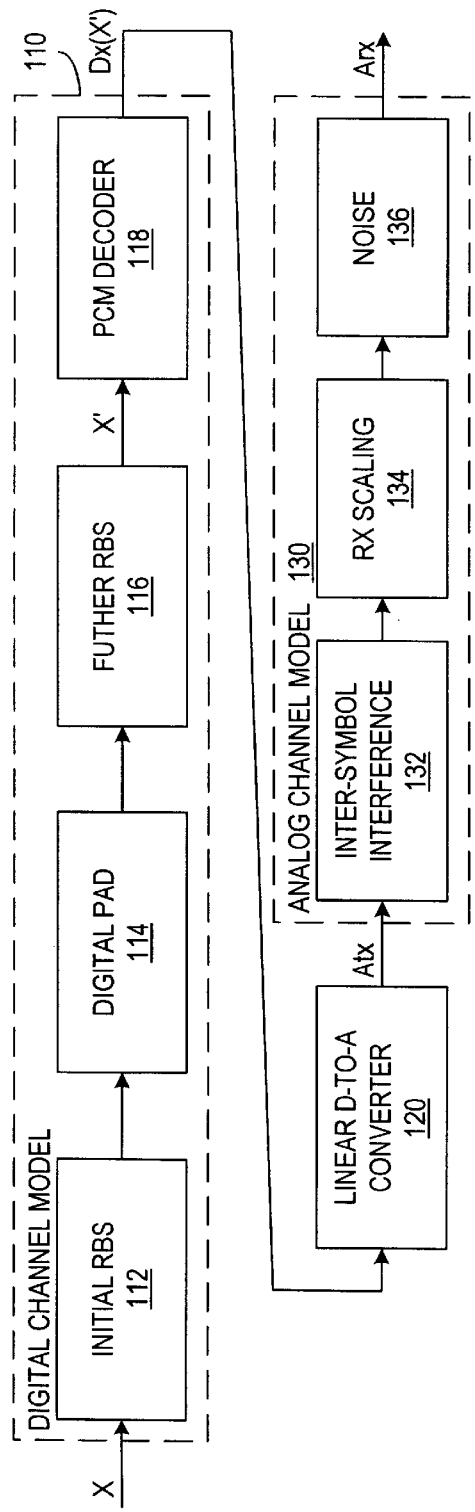
FIG. 1 is a block diagram of a model for a channel including digital and analog impairment.

In accordance with an embodiment of the invention, a digital impairment learning (DIL) process uses a probing sequence including multiple subsequences. Each subsequence repeats transmission of a code selected for the subsequence, where the sign of the selected code alternates in a pseudo-random fashion. The pseudo-random sequence has a period that is greater than the order of feedback terms used in an equalizer and prime relative to the robbed bit signaling (RBS) period (typically 6 or 12 codes). The pseudo-random nature of the sign tends to cancel inter-symbol interference (ISI) particularly in averages of the received signal. Thus, the probing sequence does not require insertion of zeros to avoid ISI. Further, the number of repetitions of a selected code with the pseudo-random signs is statistically sufficient to cancel channel noise in the averages for the received probing signal at each RBS phase. After repeatedly transmitting the selected code with pseudo-random sign, another code is selected for the next subsequence, and the probing sequence repeats that code with a sign according to the pseudo-random sequence. The full probing sequence includes subsequences for a set of codes transmitted in the same fashion with each code having the pseudo-random pattern of signs.

In accordance with another aspect of the invention, sets digital impairment mappers M(i,X) that satisfy Equation 1 model digital impairments.

$$X'=M(i,X) \qquad \text{Equation 1}$$

In Equation 1, code X is the code value input to the digital network, index i ranges over the RBS phases (e.g., 0 to 5 or 11), and value X' is the output value from the digital network after the digital impairment but before PCM encoding. A digital impairment learning (DIL) process uses the above-described probing sequence to identify the set of mappers for a channel. The DIL process includes estimating mean or average values <Y(i,X)> from the received PCM signals, estimating a receiver scaling factor S, identifying the PCM encoding method of the channel, determining measured points for the mappers associated with the channel. The mean value estimation averages the repetitions of received values for the same code to reduce the effect of channel noise and ISI. Use of the pseudo-random signs in the probing sequence makes inserting zeros in the probing sequence unnecessary. Thus, the probing sequence more effectively uses the allotted time for digital impairment learning. In accordance with a further aspect of the invention, a DIL process compensates for an equalizer to provide averages that are almost ISI free.

The DIL process determines the scale factor S before identifying the digital impairment. At the same time, the codec type and presence of strange RBS are identified. From average values <Y(i,X)> of the received signal and the scaling factor S, multiple measured points m(i,X) are determined for the digital impairment mappers M(i,X). An exhaustive matching method matches measured points m(i,X) that were determined from the probing signal with associated points for predetermined impairment mappers M(i,X) that are stored in memory of the receiver. Finding matching mappers M(i,X) identifies RBS patterns and digital pads.

FIG. 1 illustrates a model of a transmission channel including a digital channel model 110 and an analog channel model 130 in series. The channel uses a PCM communication protocol such as the ITU V.90 modem standard. Digital channel model 130 includes impairments resulting from initial robbed bit signaling 112, followed by a pad operation 114, and then further robbed bit signaling 116. As a result of the digital impairments, the input code X becomes a digital value X' which satisfies Equation 1 for some set of mappers M(i,X). A set of mappers M(i,X) can more generally describe any digital impairment and is not limited to the initial RBS 112, digital pad 114, and further RBS 116 of FIG. 1. However, describing an arbitrary channel typically requires six mappers M(i,X), one for each RBS phase, of 128 input codes X. To completely measure the mappers for each code X and phase i during a DIL process, the DIL process needs to solve for 768 variables X' which define mappers M(i,X). However, the ITU standard V.90 restricts the probing sequence for the DIL process to under five seconds, and 768 variables is a large number of variables with which to deal in the allotted time.

One DIL process in accordance with an embodiment of the invention only identifies or measures some of the values X' from the probing sequence. The DIL process then matches the determined values X' to values from predetermined mappers Mj(i,X). The predetermined mappers Mj(.,.) form a library that is stored in memory. Describing all possible combinations of different RBSs 112 and 116 and digital pad 114 would require a large library. Accordingly, to save memory space, the most common sets of mappers Mj(.,.) correspond to the most likely combinations of RBS and digital pads, can be predetermine and stored as look-up tables in memory of the modem. Once a mapper M(i,X) is identified for a particular channel, the receiver can use that mapper M(i,X) in decoding of received data. Alternatively, the library only contains entries consisting of the points for comparison to the measured points. Upon finding a matching entry, the full set of mappers or the appropriate rule for decoding can be determined.

Before the data reach the receiving modem, a PCM decoder 118 decodes the value X' according to a well known decoding rule Dx(.). A decoded value Dx(X') represents the output of PCM decoder 118 corresponding to input value X'. The subscript x in decoding Dx(.) is an index for the type of decoding that PCM decoder 118 performs. CCITT standard G.711 defines the operation of PCM decoder 118 at the interface between a digital network (digital channel model 110) and an analog telephone line (analog channel model 130). In particular, decoding Dx(.) follows one of four possible decoding rules, $D\mu(.)$ for $\mu$-law decoding, Da(.) for A-law decoding, $Dm\mu(.)$ for modified $\mu$-law decoding, and Dma(.) for modified A-law decoding. The $\mu$-law and A-law decodings $D\mu(X')$ and Da(X') are well known. The modified $\mu$-law and A-law decodings result from middle RBS where a code subjected to bit robbing decodes to the mean of the decoded values for consecutive codes (i.e., codes that are the same except for their least significant bits). For example, the $\mu$-law decoding has $D\mu(50)$, $D\mu(51)$, $D\mu(78)$ and $Dm\mu(79)$ equal to 1052, 1116, 3772, and 3900 respectively, and the modified $\mu$-law decoding has $Dm\mu(50)$ and $Dm\mu(51)$ equal to (1052+1116)/2 or 1084 and $Dm\mu(78)$ and $Dm\mu(79)$ equal to (3772+3900)/2 or 3836 during phases subject to bit robbing. Each decoding Dx(.) has a domain including 256 signed values (e.g., 8-bit codes X').

A linear digital-to-analog converter 120 converts value Dx(X') to an analog voltage that is proportional to value Dx(X') and drives the analog voltage on analog channel 130 for the sample period to generate part of an analog communication signal Atx. Analog channel model 130 introduces analog impairments including distortion or inter-symbol interference (ISI) 132, attenuation or scaling 134, and noise 136 which change analog signal Atx to a received analog signal Arx. The analog impairments 132, 134, and 136 depend on the physical media (e.g., copper telephone wires). A receiver typically includes an equalizer that is trained to remove or reduce the distortion or ISI 132.

Figure 2:
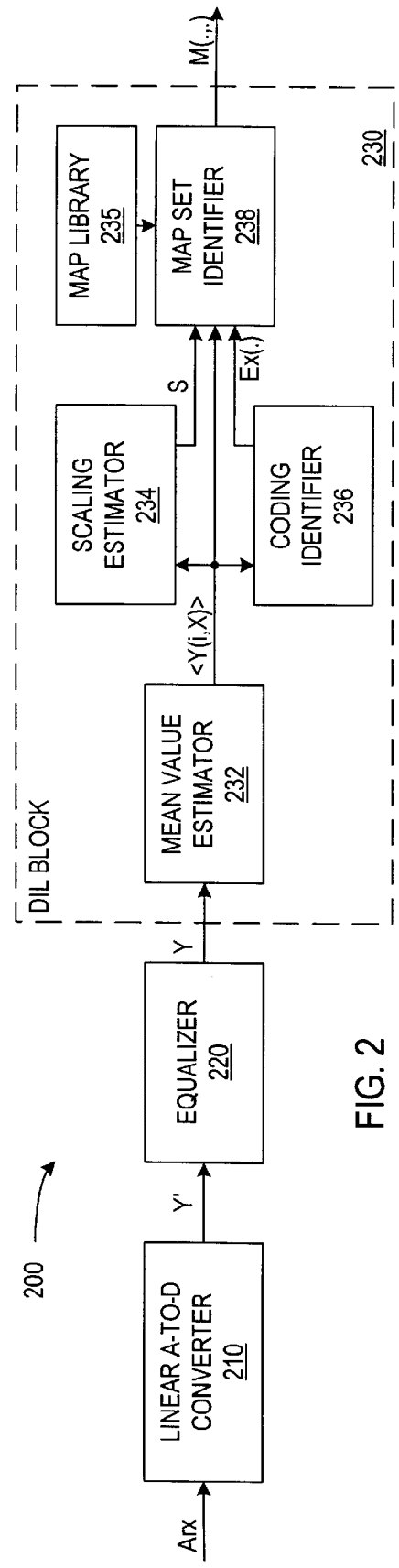
FIG. 2 is a block diagram of a portion of a receiver or modem that in accordance with an embodiment of the invention identifies the digital impairment.

FIG. 2 illustrates a portion of a receiver 200 implementing a DIL process in accordance with an embodiment of the invention. Receiver 200 includes an analog-to-digital converter (ADC) 210, an equalizer 220, and a DIL block 230. ADC 210 is a linear converter that generates a series of digital samples Y' representing the received probing signal. Equalizer 220 is a digital filter that at least partly corrects for distortion or ISI 132 in the analog portion of the channel. Methods for creating or training equalizers including filters such as FIR or IIR filters are known in the art.

Figure 3:
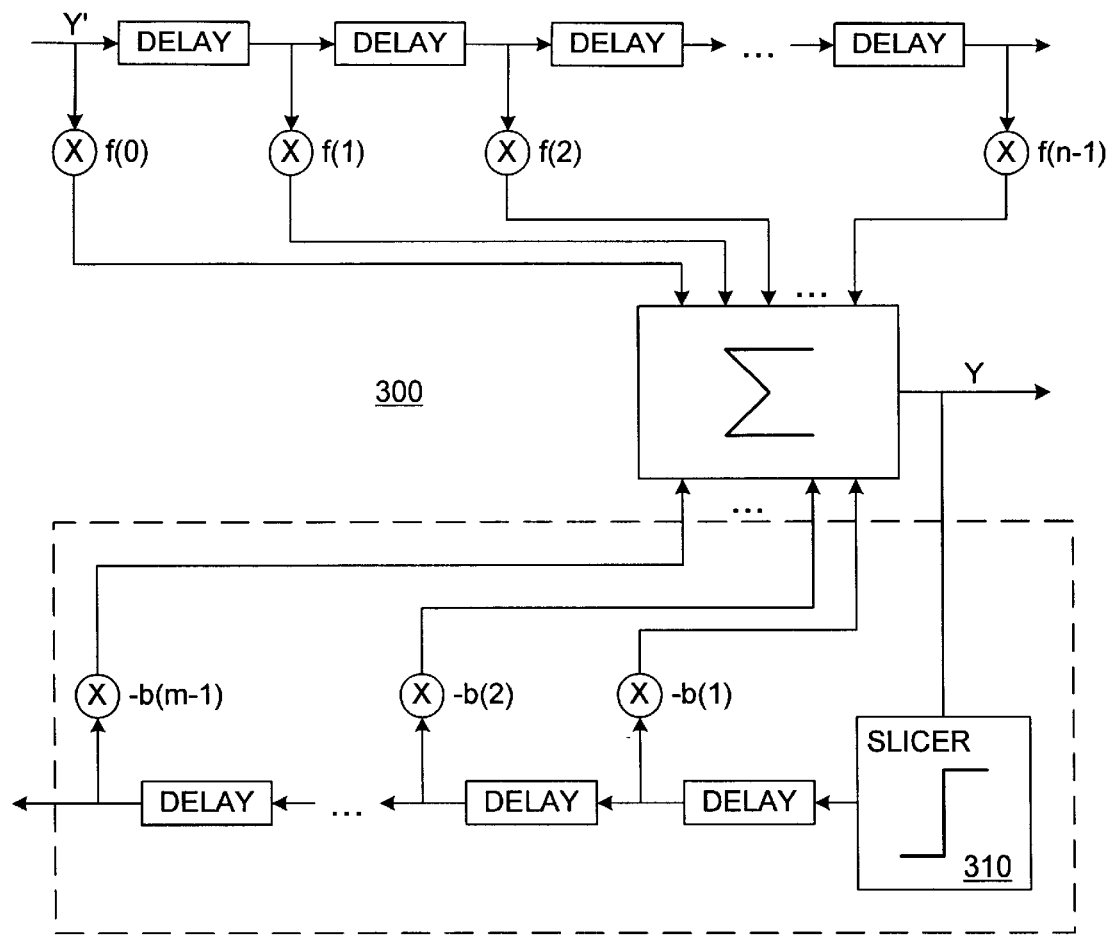
FIG. 3 is a block diagram of a decision feedback equalizer for use in the receiver of FIG. 2.

Currently, decision feedback equalizers (DFE) are popular. FIG. 3 illustrates a DFE 300 suitable for use as equalizer 220 of FIG. 2. DFE 300 sums a series of feed-forward terms and feedback terms. The feed-forward terms are products of filter coefficients f(0) to f(n−1) and input values Y' having respective delays of 0 to n−1 sampling periods. The feedback terms are products of filter coefficients b(1) to b(m−1) and output values Y of DFE 300 that have passed through a slicer 310 and been delayed of 1 to m−1 sampling periods respectively. Slicer 310 rounds output value Y to the nearest decoded value from PCM decoder 118. Given a channel response h(D) where index D is the delay relative to a current received sample, an adaptive DFE 300 satisfies Equation 2.

$$h(D)f(D)=b(D) \qquad \text{Equation 2}$$

In Equation 2, b(D) is monic, i.e., the first coefficient b(0) is 1. An equalizer such as DFE 300 can fail or perform poorly during a DIL process, even if the equalizer perfectly compensates for analog impairments. This is because the decision feedback terms introduce the digital impairments of previous symbols into a current symbol and in turn propagate impairments into future symbols. In accordance with an aspect of the invention, a receiving structure can replace or augment equalizer 220 during a DIL process to reduce or remove propagation of digital impairment from one sample to other samples.

DFE 300 uses the coefficients for feed-forward and feedback to filter samples received during normal operations of a receiver after digital impairment learning. However, during digital impairment learning, equalizer 220 does not use the feedback terms when generating filtered samples Y for DIL block 230. Equalizer 220 uses only the feed-forward terms during digital impairment learning, and as described below DIL block corrects for the feedback terms in a manner that reduces ISI and propagation of RBS or digital impairment from one same to following samples.

DIL block 230 can be implemented in software, firmware or dedicated hardware using techniques well known for communication systems and digital processing. DIL block 230 includes a mean value estimator 232, a scaling factor estimator 234, a PCM coding identifier 236, and a map identifier 238. Mean value estimator 232 averages the absolute values of received samples Y for an input code X to determine an average <Y(i, X)> for each RBS phase (e.g., i=0 to 5). (As described further below, when determining averages <Y(i,X)>, estimator 232 may also compensate for digital impairments that equalizer 220 propagates among samples.) To determine the averages, mean value estimator 232 identifies a set of samples Y with an associated code X, identifies an RBS phase i corresponding to each phase, multiplies each sample by +1 or −1 to remove sign associated with the pseudo-random sequence, and accumulates the averages <Y(i,X)> for each RBS phase i and transmitted code X. As noted above, the averaging reduces the effect of channel noise and ISI. Since the period for RBS is either 6 or 12 codes, mean value estimation block 232 determines the averages <Y(0,X)> to <Y(6,X)> using six sums for each code X. With six RBS averages, even-odd RBS has the same effect as either modified $\mu$-law or modified A-law (i.e., the other strange RBS). If strange RBS is detected, the type of the strange RBS can be subsequently identified. Alternatively, the presence of even-odd RBS can be detected or ruled out using 12 averages for a transmitted value during equalizer training or DIL.

After estimator 232 finds the averages <Y(i,X)> for one or more codes X, scaling factor estimator 234 finds receiver scaling factor S, and coding identifier block 236 identifies the encoding Ex(.) for the telephone network. In one embodiment, estimator 234 and identifier block 236 determine a measure of the error for a set of proposed scaling factors S and encodings Ex(.) and select the combination that provides the smallest error. Alternatively, whether the codec is a $\mu$-law or A-law codec can be identified from the shape of a plot of averages <Y(i,X) verses input codes X. Both scaling factor estimator 234 and coding identifier 236 can use information from the DIL sequence and from a prior training sequence for equalizer 220.

Outputs from scaling estimator 234 and coding identifier 236 are respectively the scaling factor S and an encoding Ex(.) for the channel. Encoding Ex(.) is the inverse of the decoding Dx(.) of PCM decoder 118 (FIG. 1). Multiplying averages <Y(i,X)> by the scaling factor S and applying the identified encoding Ex(.) provides measured mapper points m(i,X) for the channel. Map identifier 238 compares measured mapper points m(i,X) to points from a set of predetermined mappers Mj(.,.) in a memory 235. For the predetermined mappers Mj(.,.), j is an arbitrary index that distinguishes mappers corresponding to different digital impairments. An exhaustive matching method compares the measured mapper points m(i,X) to the same points in the predetermined mappers Mj(.,.) to identify a matching mapper M(.,.). The complete mapper M(.,.) can be used in decoding received data if match is found. The index j of the identified mapper indicates the RBS pattern and digital pad for the channel and the maximum number of bits that can be transmitted during each RBS phase.

Figure 4:
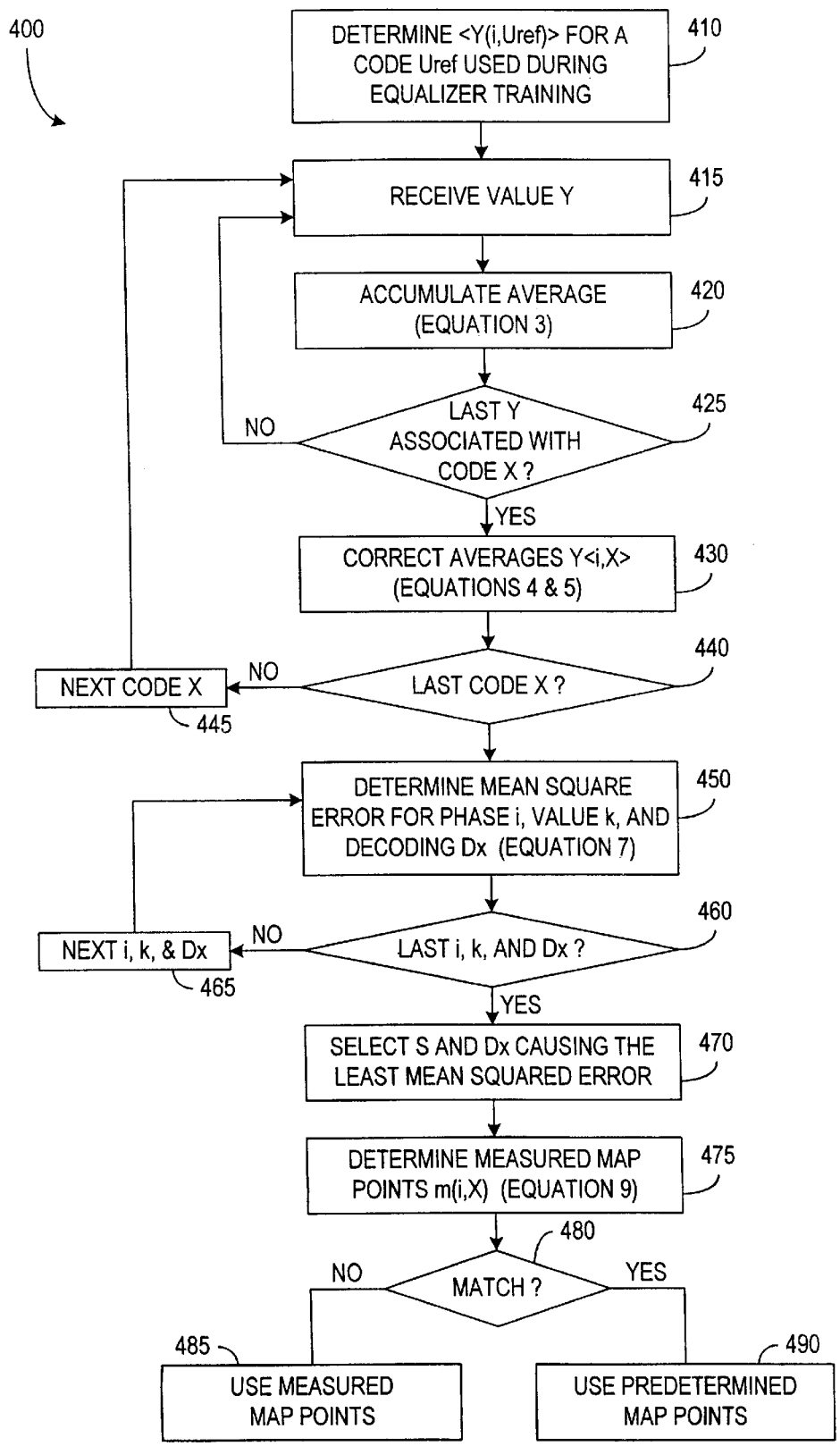
FIG. 4 is flow diagram of a digital impairment learning process in accordance with an embodiment of the invention.

FIG. 4 shows a flow diagram of a digital impairment learning process 400 in accordance with an embodiment of the invention. DIL process 400 begins after training of equalizer 220 of FIG. 2 using conventional training techniques. Step 410 determines averages <Y(i,Uref)> for a code Uref and each RBS phase i. Code Uref is a code that is transmitted during equalizer training. The relatively long duration of equalizer training provides high statistic for the averages <Y(i,Uref)> at each RBS phase.

For DIL, a transmitter sends a probing signal based on a selected set of codes X. For each code X in the selected set, the transmitter repeatedly sends a codes ±X with signs changing according to a periodic, pseudo-random (PR) sequence prs(.). The size of the selected set depends on the time available for the DIL probing signal and the length of the PR sequence prs(.). The specific codes X in the selected set can be randomly distributed from the range of codes or selected to provide the best resolution when distinguishing the predetermined mappers as described below.

PR sequence prs(.) has a period that is prime relative to the RBS period P and greater than the order of the decision feedback terms b(D) of the equalizer. Table 1 shows an exemplary subsequence that corresponds to a single code X.

TABLE 1

Exemplary Porbing Series for Code X

| Index j | 0 | 1 | 2 | 3 | 4 | 5 | 6 | 7 | 8 | 9 |
|---|---|---|---|---|---|---|---|---|---|---|
| Phase i | 0 | 1 | 2 | 3 | 4 | 5 | 0 | 1 | 2 | 3 |
| Code | +X | −X | −X | +X | −X | +X | +X | +X | −X | −X |
| prs(.) | +1 | −1 | −1 | +1 | −1 | +1 | +1 | +1 | −1 | −1 |
| 10 | 11 | 12 | 13 | 14 | 15 | 16 | 17 | 18 | 19 | 20 | 21 |
| 4 | 5 | 0 | 1 | 2 | 3 | 4 | 5 | 0 | 1 | 2 | 3 |
| +X | −X | +X | +X | +X | −X | −X | +X | −X | +X | +X | +X |
| +1 | −1 | +1 | +1 | +1 | −1 | −1 | +1 | −1 | +1 | +1 | +1 |
| 22 | 23 | 24 | 25 | 26 | 27 | 28 | 29 | 30 | 31 | 32 | 33 |
| 4 | 5 | 0 | 1 | 2 | 3 | 4 | 5 | 0 | 1 | 2 | 3 |
| −X | −X | +X | −X | +X | +X | +X | −X | −X | +X | −X | +X |
| −1 | −1 | +1 | −1 | +1 | +1 | +1 | −1 | −1 | +1 | −1 | +1 |
| | | 34 | 35 | 36 | 37 | 38 | 39 | 40 | 41 | | |
| | | 4 | 5 | 0 | 1 | 2 | 3 | 4 | 5 | | |
| | | +X | +X | −X | −X | +X | −X | +X | +X | | |
| | | +1 | +1 | −1 | −1 | +1 | −1 | +1 | +1 | | |

In Table 1, the pseudo-random sequence of signs prs(.) has a period of 7 codes which is prime relative to the RBS period P (6 codes) and is repeated P times. Each code X in the probing sequence has a similar 42 code subsequence. The V.90 protocol allows the receiver to indicate the desired probing signal using DIL descriptors and the probing sequence can cover 112 codes X from 0 to 111. The remaining codes from 112 to 128 are unlikely to be used because of the power constraints placed on transmissions. However, the mappings for codes 112 to 128 can be determined by finding a match with a predetermined set of mappers as described further below.

A receiver, in step 425, receives a value Y corresponding to the subsequence for a code X. The value Y is a filtered value from equalizer 220, but the filter operation for DIL uses only the feed-forward terms and does not use the feedback terms. In step 420, the receiver uses Equation 3 to accumulate the value Y into the appropriate initial average y(i) for the current RBS phase i.

Equation 3:

$$y(i) = \sum_{n=0 \text{ to } P-1} Y(i + 6n) * prs(i + 6n) \text{ for } i = 0 \text{ to } 5.$$

The averages of Equation 3 assume a RBS period of six. In the averages, even-odd RBS, which alternates replacing a robbed bit with 0 and 1, has the same effect as do modified $\mu$-law or modified A-law decoding. As described further below, if strange RBS is detected further processing is required to distinguish even-odd RBS from modified $\mu$-law or modified A-law decoding.

Step 425 determines where received value Y is the last for the subsequence corresponding to a value X. If the received value Y is not the last value associated with a code X, DIL process 400 branches from step 425, back to steps 415 to receive the next value Y and then accumulate the next value into the appropriate average. If the received value Y was the last for a code X, the initial averages are complete, and process 400 moves to step 430 to correct the initial averages as described further below.

Each value Y is subject to intersymbol interference (ISI), channel noise, and attenuation or other changes in scale in the analog channel. In accordance with an aspect of the invention, the pseudo-random signs of code X cause partial cancellation of intersymbol symbol interference in individual values Y and in averages y(i) of the values Y. Repetition of the code X helps cancel the noise in the averages y(i). Use of the equalizer on input values Y' to generate received values Y also helps remove ISI from averages y(i), but may be incomplete because feedback terms are not use. However, if the feedback terms of the equalizer were used, the equalizer could undesirably propagate digital impairments among the RBS phases.

In accordance with an embodiment of the invention, step 430 corrects for the feedback terms not being used in the equalizer and does so in a manner that reduces propagation of digital impairment. In particular, step 430 corrects the initial averages y(i) using Equations 4 and 5. Equation 4 gives the wrapped channel response with period six (Bi) for a decision feedback filter b(D) having coefficients b(0) to b(m−1) which are determined during training of the equalizer.

Equation 4:
$$Bi = \sum_{\text{all } j \text{ with } Mod(j,6)=i} b(j) \text{ for } i = 0 \text{ to } 5.$$

Equations 5, which attempt to correct the equalizer and ISI, represent a system of equations that are solved for final averages <Y(i,X)> for a current code X and each RBS index i from 0 to 5.

Equation 5:

| | | | | | | | |
|---|---|---|---|---|---|---|---|
| $\|N - B0$ | $-B1$ | $-B2$ | $-B3$ | $-B4$ | $-B5\|$ | $\|\langle Y(5, X)\rangle\|$ | $\|y(5)\|$ |
| $\|-B5$ | $N - B0$ | $-B1$ | $-B2$ | $-B3$ | $-B4\|$ | $\|\langle Y(4, X)\rangle\|$ | $\|y(4)\|$ |
| $\|-B4$ | $-B5$ | $N - B0$ | $-B1$ | $-B2$ | $-B3\|$ | $\|\langle Y(3, X)\rangle\| =$ | $\|y(3)\|$ |
| $\|-B3$ | $-B4$ | $-B5$ | $N - B0$ | $-B1$ | $-B2\|$ | $\|\langle Y(2, X)\rangle\|$ | $\|y(2)\|$ |
| $\|-B2$ | $-B3$ | $-B4$ | $-B5$ | $N - B0$ | $-B1\|$ | $\|\langle Y(1, X)\rangle\|$ | $\|y(1)\|$ |
| $\|-B1$ | $-B2$ | $-B3$ | $-B4$ | $-B5$ | $N - B0\|$ | $\|\langle Y(0, X)\rangle\|$ | $\|y(0)\|$ |

During step 430, estimator 232 operates on initial averages y(i) for code X in the DIL probing signal. Estimator 232 can also find averages <Y(i,Uref)> for code Uref using Equations 4 and 5, but correction is less essential for averages <Y(i,Uref)> because of the high statistic that equalizer training permits for these average.

After estimator 232 determines the averages <Y(i,X)> for the current code X, step 440 determines whether the current code X is the last code in the probing sequence. If not, process 400 branches back step 415 and uses steps 415, 420, 425, and 430 to determine averages <Y(i,X)> for the next code X from the DIL probing sequence. Once all the averages <Y(i,X)> are known, process 400 branches from step 440 to step 450 to determine an error for a proposed combination of scaling factor S and decoding Dx.

The scaling factor S can be determined from the ratio of an average value <Y(i,X)> and the value Dx(X') transmitted. The average <Y(i,Uref)> provides the highest statistics for determination of the scaling factor, but Dx(Uref) is unknown because the decoding Dx(.) and the digital impairment which converts code Uref to Uref are originally unknown. For a set of digital impairments having pads up to 6Db, reference code Uref maps to 30 different codes Uref+1 to Uref−28. For step 450, a code k from the set {Uref+1 , Uref, . . . , Uref−28} and a decoding Dx(.) are selected. (A larger set of potential codes k can be considered if more types of digital impairment or larger digital pads are a concern.) With k and Dx(.) selected, Equation 6 gives a candidate scaling factor S.

Equation 6:
$$S = \frac{\langle Y(i, Uref)\rangle}{Dx(k)}$$

If the correct coding Dx(.) was selected and the appropriate codes k are selected for the RBS phases i, the scaling factors S is approximately the same for every RBS phase.

The correct decoding Dx(.) and codes k are the ones that provide the least error in predicting the measured averages <Y(i,X)>. Equation 7 gives a weighted mean squared error MSEx(i,k) for a RBS phase i, when comparing measured averages <Y(i,X)> to expected averages calculated using the selected k and Equation 7:
$$MSEx(i, k) = \frac{1}{\{\text{size of } J\}} * \sum_{\{j \text{ in } J\}} \left(\frac{\langle Y(i, Uref)\rangle}{Dx(k)}\right)^2 * \left(Qex\left[\frac{(Dx(k))*\langle Y(i, j)\rangle}{\langle Y(i, Uref)\rangle}\right]\right)^2$$

In Equation 7, set J is a subset of the codes X in the DIL sequence and is typically equal to the set of all codes X transmitted during the DIL probing sequence. Function Qex[.] is the quantization error as defined in Equation 8.

$$Qex[Y]=Dx(Ex(Y))-Y \qquad \text{Equation 8}$$

In Equation 8, index x is $\mu$, a, m$\mu$, or ma to indicate $\mu$-law, A-law, modified $\mu$-law, or modified A-law.

Step 450 determines the error for a possible combination of RBS phase i, code k, and decoding Dx(.). Step 460 determines whether the error has been determined for every combination of i, k, and Dx(.). If not, process 400 branches from step 460, through step 465, back to step 450 and determines the error for the next combination of i, k, and Dx(.). After determining the error for the last combination of i, k, and Dx(.), process 400 moves from step 460 to step 470 and selects a scaling factor and a decoding. In particular, for each value of RBS phase i, step 470 identifies a combination of k and Dx that gives the least error as determined in step 450. Scaling factors for each RBS phase can then be determined from Equation 6. Usually, the best scaling factors S for the RBS phases are very close to each other and the actual scaling factor S. Occasionally, if the factors are quite different, a retraining operation can be initiated to start digital learning again. The best decoding Dx(.) should be the same for all RBS phases, except that $\mu$-law (or A-law) decodings may be mixed with strange RBS, i.e., modified $\mu$-law (or A-law) or even-odd RBS. A mixture of $\mu$-law and A-law being best for different RBS phase indicates a need for retraining.

If process 400 identifies strange RBS, the process determines averages for a 12-sample RBS period. If averages that are six RBS phase apart are the same, the strange RBS is modified μ-law or modified A-law. If averages that are six RBS phase apart are significantly different, the strange RBS is modified even-odd RBS.

After determining the scaling factor S and the decoding Dx(.), step 475 determines the measured map points corresponding to the determined corrected averages. More specifically, Equation 9 indicates the measured point m(i,X) in terms of the determined scaling factor S, the identified encoding Ex, and the averages <Y(i,X)>.

$$m(i,X)=Ex(S^*<Y(i,X)>) \quad \text{Equation 9}$$

Once the measured points m(i,X) are known, step 480 searches through a library of predetermined mappers corresponding to specific digital impairments to find mappers matching the identified mapper points. In one embodiment the predetermined mappers include all mappers corresponding to no digital pad, some 3 dB pads, and some 6 dB pads sandwiched by all possible RBS patterns. The set of identified mappers from the library has associated a known RBS pattern and digital pad. The full mappers M(.,.) can be reconstructed if a precise combination of digital impairments is identified.

In a matching set of predetermined mappers is found, the receiver can use the predetermined mappers in decoding of received samples Y. If no matching predetermined mappers are found, the receiver can use the measured mapper points m(i,X) in decoding received samples. As noted above, DIL for the V.90 protocol can use a probing sequence and measure mapping points covers the most likely codes (e.g., −111 to +111) to be used for conveying data.

The appendix includes a listing of a software implementation of a DIL receiver system that is compliant with the ITU V.90 modem standard and implements a DIL process in accordance with an embodiment of the invention.

Although the invention has been described with reference to particular embodiments, the description is only an example of the invention's application and should not be taken as a limitation. For example, although the description mainly uses the example of probing signals where one code is consecutively transmitted with a pseudo-random sign, codes transmitted in a probing signal can be order or mixed in a variety of ways. For example, alternative embodiments can employ two or more codes that are interwoven and transmitted with pseudo-random signs. Various other adaptations and combinations of features of the embodiments disclosed are within the scope of the invention as defined by the following claims.

We claim:

1. A digital impairment learning process comprising:
   receiving a series of digital samples of a probing signal transmitted over a channel;
   identifying a first set of the samples that corresponds to a first code, the first set corresponding to repeated transmission of the first code over the channel, wherein each repetition of the first code has a sign from a pseudo-random series of signs;
   determining a plurality of averages of samples from the first set, each average corresponding to an associated phase of robbed bit signaling that occurs in the channel; and
   identifying digital impairment in the channel using the averages.

2. The process of claim 1, further comprising:
   generating a probing sequence including one or more subsequences, each subsequence containing repetitions of a code with each repetition having a corresponding sign from the pseudo-random series;
   transmitting the probing sequence over a digital portion of the channel, wherein the probing sequence acquires a digital impairment and becomes an impaired sequence;
   converting the impaired sequence to an analog signal;
   transmitting the analog signal over an analog portion of the channel, wherein the analog signal acquires an analog impairment and becomes an a received analog signal sequence; and
   converting the received analog signal into the series of received digital samples.

3. The process of claim 1, wherein identifying the digital impairment comprises:
   determining a scaling factor for the channel;
   identifying a pulse code modulation (PCM) decoding employed in the channel;
   scaling the averages by the scaling factor to generate scaled averages;
   encoding the scaled averages using an encoding method that corresponds to the identified PCM decoding, wherein encoding generates measured points;
   comparing the measured points to corresponding points in predetermined mappers from a library; and
   identifying the predetermined mapper that matches the measured points.

4. The process of claim 1, wherein determining the plurality of averages comprises:
   determining a plurality of initial averages, each initial average being an average of samples corresponding to an associated phase of the robbed bit signaling; and
   correcting the initial averages to correct for propagation of the digital impairment by an equalizer in a receiver of the digital samples.

5. The process of claim 4, wherein correcting the initial averages comprises:
   determining a wrapped channel response for the equalizer, the wrapped channel response having a period equal to a period of the robbed bit signaling; and
   solving a system of equations for the averages, the system of equation equating a vector containing the initial averages with a product of a matrix derived from the wrapped channel response and a vector containing the averages.

6. The process of claim 1, wherein the probing signal is in compliance with the V.90 modem standard.

7. The process of claim 1, wherein identifying the digital impairment in the channel comprises:
   (a) selecting a candidate scaling factor and a candidate decoding for the channel during an RBS phase;
   (b) determining an error indicating a difference between the averages for the RBS phase and a value predicted for the averages based on the candidate scaling factor and the candidate decoding;
   (c) repeating (a) and (b) until each combination from a set of combinations of a scaling factor and a decoding have been selected; and
   (d) identifying the combination for which the error determined is smallest.

8. A digital impairment learning process comprising:
   receiving through an equalizer, a series of digital samples of a probing signal transmitted over a channel;
   determining a plurality of initial averages, each initial average being an average of samples corresponding to an associated phase of robbed bit signaling in the channel;

correcting the initial averages to correct for propagation of the digital impairment by the equalizer; and identifying digital impairment in the channel using the averages as corrected.

9. The process of claim 8, wherein the equalizer performs a first filter operation during normal operation and a second filter operation during receipt of the probing sequence, the first filter operation involving feed-forward terms and feedback terms, the second filter operation not using the feedback terms.

10. The process of claim 8, wherein correcting the initial averages comprises:

determining a wrapped channel response for the equalizer, the wrapped channel response having a period equal to a period of the robbed bit signaling; and solving a system of equations for the averages, the system of equation equating a vector containing the initial averages with a product of a matrix derived from the wrapped channel response and a vector containing the averages.

11. The process of claim 8, wherein the probing signal is in compliance with the V.90 modem standard.

12. A receiver comprising:

a mean value estimator coupled to receive a series of samples representing a probing signal transmitted over a channel, wherein the mean value estimator determines a plurality of averages, wherein each average corresponds to a phase of robbed bit signaling on the channel and is determined from a sum of products, each product being the product of a sample from the series and a corresponding value from a pseudo-random series of +1 and −1;

a memory storing entries corresponding to a library of mapper sets, each mapper set having an associated digital impairment and defining a correspondence between input codes and output codes of a digital network having the associated digital impairment; and a map identifier operably coupled to mean value estimator and the memory, wherein the map identifier identifies an entry in the memory that matches the averages.

13. The receiver of claim 12, further comprising:

a coding identifier operably coupled to receive the averages, wherein the coding identifier processes the averages to identify a coding process used in the channel; and a scaling estimator operably coupled to receive the averages, wherein the coding identifier processes the averages to identify a scaling factor, wherein the map identifier identifies the entry as matching the averages as adjusted for the scaling factor and the coding process.

14. The receiver of claim 12, wherein the probing signal includes one or more subsequences, each subsequence including repetitions of a code, each repetition being multiplied by an associated value from a pseudo-random series of +1 and −1.

15. The receiver of claim 12, further comprising an equalizer that filters the samples that the mean value estimator receives, wherein the mean value estimator determines the plurality of averages using a process including:

determining a plurality of initial averages, each initial average being an average of samples corresponding to an associated phase of the robbed bit signaling; and correcting the initial averages to correct for propagation of the digital impairment by an equalizer in a receiver of the digital samples.

16. The receiver of claim 12, further comprising an equalizer that performs a first filter operation during normal operation and a second filter operation during receipt of the probing signal, the first filter operation involving feed-forward terms and feedback terms, the second filter operation not using the feedback terms.

* * * * *